Sept. 3, 1935. D. M. WATKINS 2,013,593
SCREWTHREAD CUTTING TOOL
Filed Sept. 1, 1934

Inventor:
DOUGLAS MACKENZIE WATKINS

Patented Sept. 3, 1935

2,013,593

UNITED STATES PATENT OFFICE 2,013,593

SCREWTHREAD CUTTING TOOL

Douglas Mackenzie Watkins, Brookmans Park, Hatfield, England, assignor of one-half to William Edgar Dilke, South Woodford, England Application September 1, 1934, Serial No. 742,429
In Great Britain April 13, 1934

2 Claims. (Cl. 10—123)

This invention relates to tools for cutting male screwthreads. Hitherto it has been customary to provide a single stock adapted or arranged to receive interchangeably a series of collets or holders, each collet being capable of accommodating one or two sets of cutting dies. The sets of dieblocks accommodated in each collet seldom exceeded more than two or three, so that a comparatively large number of expensive collets were necessary for use with a nominal range of die sizes.

In order to accommodate a plurality of sets of dies interchangeably in a single holder or housing, such as a stock or a collet within a stock, there has previously been provided a holder for each die set in which the set can be firmly held in any desired adjusted relation either in or out of the collet or stock, and the object of the present invention is to provide an adapter rather than a holder for each die set by which the clamping of the die set and adapter in the collet or stock can be effected by applying pressure directly to the die by the simple action of screwing up the usual work guide into the tool in contradistinction to the known arrangement where the work guide is screwed against the die holder. The invention thus allows of more than one die set being clamped in the tool with the same adapter, besides providing a very simple and cheap manufacturing construction and permitting ready insertion and removal of the dies in and from the tool.

Accordingly the present invention provides a screw-thread cutting tool comprising a single holder or housing with a standard-size aperture therein, a plurality of sets of cutting dies and a series of adapters, each of substantially uniform external dimensions so as to fit within the standard-size aperture in the holder and each adapted to accommodate one or more interchangeable sets of dies. The adapter is of cradle or trough form with a work-clearing aperture in the underside thereof. The side walls of the adapter are tapered, and, if desired, the inner and outer faces of the adapter side walls are correspondingly tapered. The ends of the adapter are open or have an opening therein through which the die clamping screws pass. Other suitable means for adjusting the die may be employed.

The invention is illustrated by the accompanying drawing, wherein:—

Figure 1:
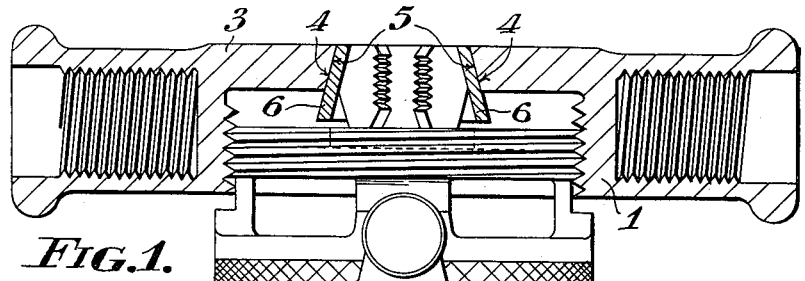
Figures 1 and 2 are a longitudinal sectional view and a plan of a stock with an adapter for tapered dies in position.
Figure 2:
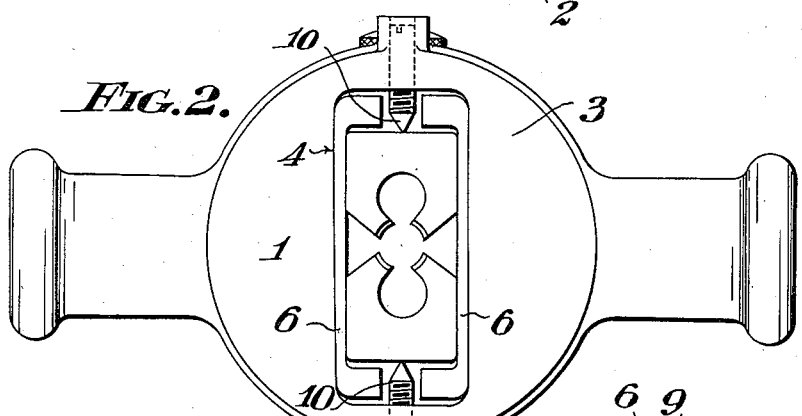
Figure 3:
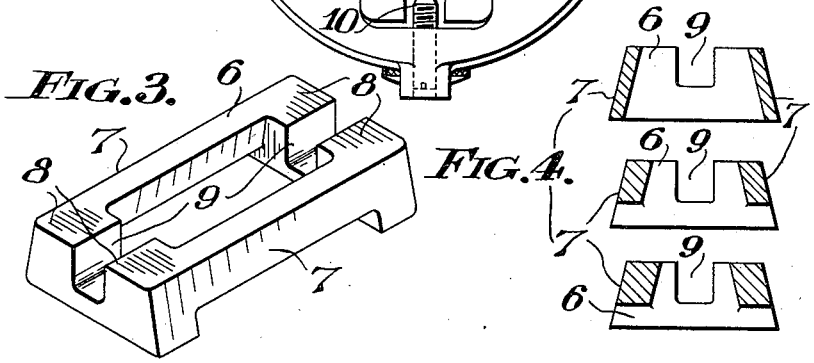
Figure 3 is a pictorial view of the adapter shown in Figures 1 and 2.
Figure 4:
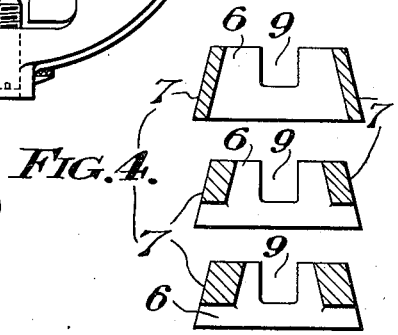
Figure 4 illustrates, in a transverse cross-section, a range of adapters for use with the same holder or stock.

Figures 1 and 2 of the drawing illustrate a stock 1 which has no collet, but into which screws the adjustable work guide 2. This work guide 2 is of any suitable form. The top face 3 of the stock 1 is provided with a rectangular aperture 4 having inwardly tapering side walls 5. The aperture 4 is of a size to receive directly the die-blocks for the largest screwthreads covered by the range of the tool. The outer side walls of the die-blocks are tapered to correspond with the tapering walls 5 of the aperture 4 and, if convenient, the die-blocks for the largest two or three screwthreads dealt with may have corresponding external dimensions so that they fit directly into the aperture 4. For cutting smaller-size screwthreads adapters are employed so as to avoid using die-blocks of an unnecessarily large size. These adapters 6 have their longitudinal side walls 7 open from side to side and of the same taper and at the same distance apart as the walls 5 of the stock aperture 4, but the walls 7 are of varying thicknesses (see Figure 4) so as each to accommodate one or more smaller sets or pairs of die-blocks. The inner faces of the walls 7 are preferably of the same taper as the outer faces. The end walls 8 of the rectangular frame-like adapters 6 may project below the side walls 7 and have slots or gaps 9 therein through which pass the ends of the dieblock clamping screws 10 carried by the stock 1. The adapter 6 is held in position within the aperture 4 by the die-blocks 11, against the underside of which the guide 2 abuts, as shown in Fig. 1.

It is to be understood that although the adapters have been shown as applied to a holder or stock, they are equally applicable for use with a single collet member held in a stock in the usual manner.

I claim:—

1. In a screw thread cutting tool including a holder having an outwardly tapered aperture for receiving a tapered die set the external dimensions of which are smaller than the aperture, and a screw threaded housing formed around the aperture to receive a work guide, a rigid frame like adapter the side walls of which are tapered to fit the aperture and to take up the space between the walls of the aperture and the die set and which is open from side wall to side wall so that the die set can be inserted axially thereinto with the underneath surface projecting beyond the wider opening of the adapter into the housing for direct engagement by the work guide when screwed in the housing.

2. In a screw thread cutting tool according to claim 1 end walls connecting the side walls of the adapter and provided with gaps through which the die clamping screws pass.

DOUGLAS MACKENZIE WATKINS.